Jan. 13, 1959
O. J. POUPITCH
2,868,256
HELICALLY FORMED RESILIENT LOCK WASHER WITH
INNER NUT ENGAGING AND OUTER
WORK ENGAGING TEETH
Filed Sept. 23, 1954
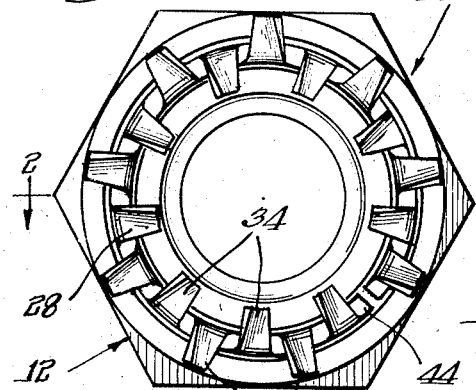
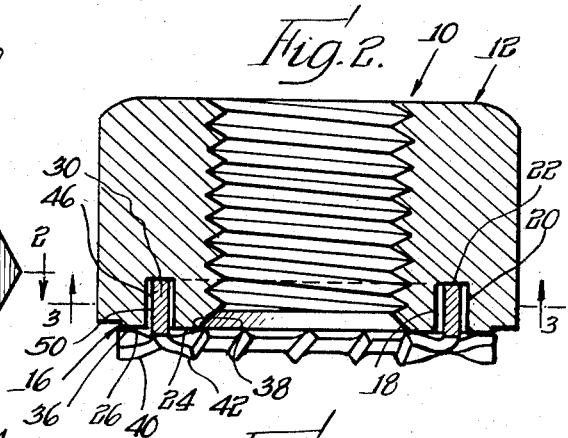
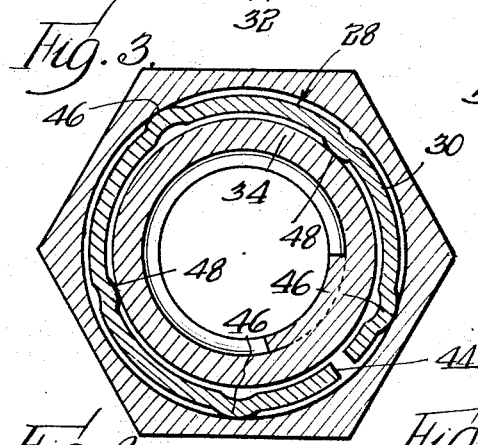
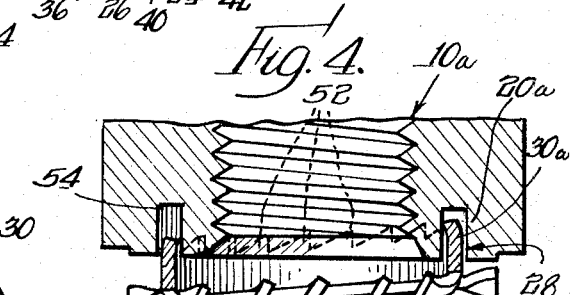
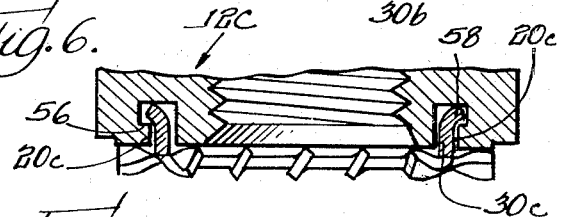
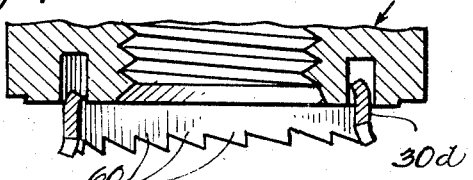
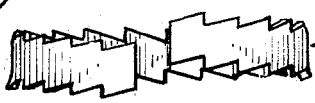
INVENTOR.
Ougljesa Jules Poupitch
BY
Olson & Trexler
Attys.

United States Patent Office 2,868,256
Patented Jan. 13, 1959

2,868,256

HELICALLY FORMED RESILIENT LOCK WASHER WITH INNER NUT ENGAGING AND OUTER WORK ENGAGING TEETH

Ougljesa Jules Poupitch, Itasca, Ill., assignor to Illinois Tool Works, Chicago, Ill., a corporation of Illinois Application September 23, 1954, Serial No. 457,989

1 Claim. (Cl. 151—35)

The present invention relates to a novel preassembled fastener unit and more particularly, to a novel preassembled fastener unit including a threaded rotary fastener such as a nut or a screw and a lock washer.

An important object of the present invention is to provide a novel preassembled rotary fastener and lock washer unit which is formed so as to have increased holding and locking power as compared with generally similar units heretofore suggested.

Another object of the present invention is to provide a novel preassembled rotary fastener unit including a threaded fastener member such as a nut or a screw, and a lock washer formed so as to facilitate assembly thereof with the fastener element in a simple and economical manner.

A further object of the present invention is to provide a novel preassembled rotary fastener unit including a threaded fastener such as a nut or a screw and a novel lock washer having a plurality of teeth, which washer is formed so that the teeth are successively brought into operation during application of the unit to a workpiece in order to facilitate the initial application of the unit while enabling the unit to be securely locked against inadvertent retrograde movement.

Other objects and advantages of the present invention will become apparent from the following description and accompanying drawings wherein:

Fig. 1 is a bottom end view of a novel rotary fastener unit embodying the principles of this invention;

Fig. 2 is a vertical cross sectional view taken along line 2—2 in Fig. 1;

Fig. 3 is a cross sectional view of the novel lock washer of this invention taken along line 3—3 in Fig. 2;

Fig. 4 is a fragmentary cross sectional view similar to Fig. 2 but showing a modified form of the present invention;

Fig. 5 is a fragmentary cross sectional view similar to Fig. 2 but showing another modified form of the present invention;

Fig. 6 is a fragmentary cross sectional view showing still another modified form of the present invention;

Fig. 7 is a fragmentary cross sectional view similar to Fig. 2 but showing still another modified form of the present invention;

Fig. 8 is a plan view of the lock washer shown in Fig. 7; and

Fig. 9 is an elevational view of the lock washer shown in Figs. 7 and 8.

Referring now more specifically to the drawings wherein like parts are designated by the same numerals throughout the various figures, a rotary fastener unit 10 embodying one form of the present invention is shown in Figs. 1, 2 and 3. The unit 10 includes a nut member 12 of any conventional polygonal shape, which nut member has an axially extending bore defined by helical threads 14 and an axially projecting radial clamping face 16. In accordance with the present invention, the nut member is provided with an annular axially extending groove or recess in the clamping face, which groove is defined by inner and outer axially extending and radially spaced side walls 18 and 20 and a bottom wall 22. It should be noted that the annular groove is disposed so that the clamping face or surface 16 is divided to provide an inner annular clamping face section 24 and a radially outwardly spaced annular clamping face section 26.

The rotary fastener unit 10 also includes a lock washer 28 made from resilient sheet material and preferably made from spring steel. The lock washer includes an annular and axially extending body portion 30 which is adapted to be inserted and retained within the annular groove in the nut. In accordance with an important feature of the present invention, the washer is provided with a plurality of prongs 32 extending substantially radially outwardly from the outer axial margin of the body portion and also a plurality of circumferentially spaced prongs 34 extending radially inwardly from the outer margin. Each of these prongs is twisted about its radial axis so as respectively to present tooth edges 36 and 38 for biting into the clamping face sections 26 and 24 and tooth edges 40 and 42 for biting into a workpiece, not shown. By positioning the groove in the nut so as to provide both inner and outer clamping face sections and by providing the washer both with radially inwardly and outwardly extending prongs or tooth elements, the locking effectiveness of the washer is materially increased. Furthermore, it should be noted that the helical threads 14 extend for substantially the full extent of the axial bore of the nut whereby the strength or the holding power of the nut is maintained at a maximum.

The annular body portion 30 of the lock washer is preferably split as at 44 and is preferably formed with a diameter such that the washer must be sprung for insertion into the groove in the nut whereby the resiliency of the sheet material urges the washer body portion tightly against one of the side walls of the groove for securely frictionally retaining the washer and the nut in assembled relationship. Conveniently the initial diameter of the washer body may be made such that the washer body must be sprung inwardly for insertion into the groove. In order to secure an even more positive connection between the lock washer and the nut member, a plurality of circumferentially spaced protuberances 46 are struck outwardly from the annular body portion and a plurality of similar protuberances 48 are struck inwardly. These protuberances are formed so that the radial distance between circles defined by the outer and inner protuberances is substantially equal or even slightly greater than the radial width of the groove in the nut. With this arrangement, the inner and outer protuberances firmly engage opposite sides of the groove and the sections of the annular washer body between the protuberances may be slightly flexed during application of the body to the groove so as to resiliently urge the protuberances into positive engagement with the walls of the groove. Furthermore, the protuberances 46 are formed with relatively sharp edges 50 and protuberances 48 are formed with similar relatively sharp edges, which edges bite into the walls of the groove to restrain inadvertent disassembly of the nut and the nut washer.

In Fig. 4, there is shown a modified form of the present invention which is similar to the above described structure as indicated by the application of identical reference numerals with the suffix "a" added to corresponding elements. In this embodiment, the protuberances 46 and 48 have been omitted from the washer body portion 30a and a plurality of circumferentially spaced generally axially extending tooth elements 52 have been provided on the axial inner margin of the washer body. These tooth elements serve to dig into the bottom wall of the groove in the nut to even more securely lock the nut and washer against relative rotation when the unit is applied to a workpiece.

The annular washer body 30a is formed so that it has an initial outer diameter slightly larger than the diameter of the outer groove wall 20a so that the washer body must be collapsed or sprung inwardly for insertion into the groove. In order to facilitate such insertion, the tooth elements 52 are bent radially inwardly so that outer radial surfaces 54 thereof provide cam surfaces adapted to enter the groove and cause collapsing of the washer body during assembly of the washer with the nut.

It should be noted that the split annular washer body 30a is helically formed so that a portion thereof is only partially situated within the groove. Thus, when the fastener unit 10a is applied to a complementary screw member, not shown, and tightened against a workpiece, not shown, only a portion of the tooth elements or prongs 32a and 34a initially engage the workpiece and only a portion of the prongs and the teeth elements 52 initially engage the nut member. This arrangement facilitates initial application of the fastener unit 10a while the ultimate locking power of the unit is not diminished and may even be increased since as the unit is tightened to its final position, all of the prongs and all of the teeth 52 will be brought into operation and the resiliency of the body portion 30a will be added to the resiliency of the prongs for maintaining prongs in secure engagement with the workpiece upon any tendency of the unit to become loosened.

Fig. 5 shows another slightly modified form of the present invention wherein the generally axially extending side walls 18b and 20b of the groove are flared with respect to the axis of the nut. In addition, the annular generally axially extending body portion 30b of the lock washer is flared inwardly or formed so as to have a generally frusto-conical shape. With this structure the split body portion 30b may be spread apart for insertion into the groove until the smaller inner end has a diameter substantially equal to the mouth of the groove whereupon the body portion may be fully inserted within the groove in overlying relationship with respect to the outwardly flared groove side wall 18b for retaining the nut and washer in assembled relationship.

Fig. 6 shows another modification of the present invention wherein one of the groove side walls is undercut and the axial inner end of the washer body portion 30c is flared to cooperate with the undercut side wall for retaining the nut and washer in assembled relationship. In the form illustrated, the outer side wall 20c is undercut as at 56 and the washer body is flared outwardly as at 58. It will be appreciated that the groove in the nut member 12c should be made wide enough to permit the split washer body 30c to be collapsed sufficiently to allow the flared inner end portion 58 to pass into the groove and then hook behind the internal shoulder provided by the undercut.

In Figs. 7, 8 and 9, there is illustrated another embodiment of the present invention which is similar to the embodiment shown in Fig. 4 as indicated by the application of identical reference numerals with the suffix "d" added to corresponding elements. This embodiment differs in that the above described radially inwardly and outwardly extending prongs have been omitted and have been replaced by a plurality of circumferentially spaced generally axially extending tooth elements 60 on the axial outer margin of the body portion 30d. While the locking power of this embodiment is somewhat diminished as compared to the above described embodiments, the simplified locking teeth 60 permit more economical manufacturing of the washer 28d and provide sufficient locking power for many installations.

From the above description it is seen that the present invention has provided a novel preassembled nut and lock washer unit which is formed so that the nut and lock washer may be readily and economically assembled and retained together. Furthermore, it is seen that the present invention has provided a novel preassembled rotary fastener unit having materially increased holding and locking power. It is also seen that the present invention has provided a novel rotary fastener unit wherein the lock washers are formed so as to permit relatively easy initial application to the work without impairing their locking power when the unit is tightened to its final assembled position.

While the preferred embodiments of the present invention have been shown and described herein, it is obvious that many structural details may be changed without departing from the spirit and scope of the appended claim. For example, the tooth elements on the inner axial edges of the washers shown in Figs. 4 and 7 through 9 may also be provided on the inner edges of the washers shown in Figs. 1 through 3, 5 and 6. Furthermore, the washers shown in Figs. 1 through 3, 5 and 6 may be helically twisted in the same manner as the washers 28a and 28d.

The invention is claimed as follows:

A preassembled rotary fastener assembly comprising a threaded rotary fastener member having a substantially radially extending clamping face and an annular substantially axially extending groove of predetermined radial width in said clamping face between inner and outer margins thereof, and a resilient sheet metal lock washer including a substantially axially extending annular body portion having a radial thickness substantially less than the width of said groove, said body portion being axially split and helically twisted substantially uniformly around the entire circumference thereof with the end portions axially offset from one another, said body portion initially having a diameter different from the corresponding diameter of a first side wall of said groove and being sprung into said groove with one side of the body portion resiliently engaging the said first side wall of the groove for retaining the washer and fastener member in assembled relationship, a plurality of tooth means on and spaced substantially along the full circumferential length of the inner margin of said body portion and said tooth means being bent in one direction out of the plane of the body portion and projecting axially and radially outwardly from the opposite side of said body portion for biting engagement with the fastener member within said groove and facing circumferentially in one direction for restraining rotation of the washer relative to the fastener member in that direction, said axially and radially extending tooth means adjacent the body portion presenting inclined side cam surfaces engageable with the said first side wall of the groove for facilitating insertion of the washer body into the groove, and a plurality of additional tooth means on and spaced circumferentially along the outer margin of said body portion and bent in an opposite direction from the plane of the body portion to project in the opposite direction from the first-mentioned tooth means for engaging a workpiece and restraining rotation of the washer relative to the workpiece in a direction opposite to the direction in which said first-mentioned tooth means face.

References Cited in the file of this patent

UNITED STATES PATENTS

| | | |
|---|---|---|
| 122,676 | Stouffer | Jan. 9, 1872 |
| 605,788 | Johnson | June 14, 1898 |
| 1,667,803 | Hosking | May 1, 1928 |
| 1,924,695 | Olson | Aug. 29, 1933 |
| 2,014,231 | Garrett | Sept. 10, 1935 |
| 2,128,429 | Olson | Aug. 30, 1938 |
| 2,424,208 | Poupitch | July 15, 1947 |
| 2,559,833 | Stellin | July 10, 1951 |
| 2,648,247 | Schmuziger | Aug. 11, 1953 |
| 2,763,312 | Redmer | Sept. 18, 1956 |

FOREIGN PATENTS

| | | |
|---|---|---|
| 674,213 | Great Britain | June 18, 1952 |